(12) United States Patent
Gaye et al.

(10) Patent No.: US 11,920,604 B2
(45) Date of Patent: Mar. 5, 2024

(54) CABIN AIR COMPRESSOR SHAFT AND TIE ROD SUPPORT

(71) Applicant: Hamilton Sundstrand Corporation, Charlotte, NC (US)

(72) Inventors: Ousmane Gaye, Hartford, CT (US); Darryl A. Colson, West Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 273 days.

(21) Appl. No.: 17/245,361

(22) Filed: Apr. 30, 2021

(65) Prior Publication Data

US 2022/0349416 A1 Nov. 3, 2022

(51) Int. Cl.
| | |
|---|---|
| *F04D 29/043* | (2006.01) |
| *B64D 13/06* | (2006.01) |
| *F04D 19/00* | (2006.01) |
| *F04D 25/06* | (2006.01) |
| *F04D 25/08* | (2006.01) |

(Continued)

(52) U.S. Cl.
CPC ........... *F04D 29/043* (2013.01); *B64D 13/06* (2013.01); *F04D 19/00* (2013.01); *F04D 25/06* (2013.01); *F04D 25/0606* (2013.01); *F04D 25/082* (2013.01); *F04D 29/046* (2013.01); *F04D 29/056* (2013.01); *F04D 29/5806* (2013.01);
(Continued)

(58) Field of Classification Search
CPC .................. F04D 25/06; F04D 29/5806; F04D 19/00; F04D 25/0606; F04D 25/082; F04D 29/584; F04D 29/056; F04D 29/043; F04D 29/046; B64D 13/06
See application file for complete search history.

(56) References Cited

U.S. PATENT DOCUMENTS 8,622,620 B2 * 1/2014 Beers ................... F04D 29/057
384/115
9,347,488 B2 * 5/2016 Thoma .................... F16C 33/24
(Continued)

FOREIGN PATENT DOCUMENTS

| EP | 2811169 A1 | 12/2014 |
|---|---|---|
| EP | 3284963 B1 | 4/2020 |

OTHER PUBLICATIONS

Extended European Search Report for EP Application No. 22170783.9, dated Sep. 21, 2022, 8 pages.

*Primary Examiner* — Peter J Bertheaud
(74) *Attorney, Agent, or Firm* — Kinney & Lange, P.A.

(57) ABSTRACT

A shaft for a cabin air compressor includes a first attachment portion, a second attachment portion, an intermediate portion, a retention flange, and a tie rod support pocket. The first attachment portion is disposed at a first end of the shaft. The second attachment portion is disposed at a second end of the shaft opposite the first end. The intermediate portion extends from the first attachment portion to the second attachment portion and an interior wall of the intermediate portion defines an inner shaft space. The retention flange extends a first distance into the inner shaft space from the interior wall of the intermediate portion and is offset from the first attachment portion by a second distance. The tie rod support pocket is defined by the interior wall, extends between the flange and the first attachment portion, and is configured to receive a tie rod support.

18 Claims, 3 Drawing Sheets

(51) Int. Cl.
   *F04D 29/046* (2006.01)
   *F04D 29/056* (2006.01)
   *F04D 29/58* (2006.01)

(52) U.S. Cl.
   CPC .... *F04D 29/584* (2013.01); *B64D 2013/0644* (2013.01)

(56) References Cited

U.S. PATENT DOCUMENTS

| | | |
|---|---|---|
| 9,862,493 B2 | 1/2018 | Beers et al. |
| 10,174,765 B2 | 1/2019 | Colson et al. |
| 2013/0052053 A1 | 2/2013 | Colson et al. |
| 2016/0186806 A1 | 6/2016 | Dorman et al. |

* cited by examiner

CABIN AIR COMPRESSOR SHAFT AND TIE ROD SUPPORT

BACKGROUND

The present disclosure relates to air compressors and, more particularly, to shaft suitable for use with air compressors suitable for providing pressurized air to an aircraft environmental control system.

As an alternative to bleed air, a separate air compressor, such as a cabin air compressor, can be used to provide pressurized air to an aircraft environmental control system. Using a separate air compressor can reduce both the overall complexity and the need for maintenance of the environmental control system. Using a separate air compressor can also improve the fuel efficiency of the environmental control system.

SUMMARY

In one embodiment, a shaft for a cabin air compressor includes a first attachment portion, a second attachment portion, an intermediate portion, a retention flange, and a tie rod support pocket. The first attachment portion is disposed at a first end of the shaft and is configured to attach to a first component. The second attachment portion is disposed at a second end of the shaft opposite the first end and is configured to attach to a second component. The intermediate portion extends from the first attachment portion to the second attachment portion and an interior wall of the intermediate portion defines an inner shaft space. The retention flange extends a first distance into the inner shaft space from the interior wall of the intermediate portion and is offset from the first attachment portion by a second distance. The tie rod support pocket is defined by the interior wall, extends between the flange and the first attachment portion, and is configured to receive a tie rod support.

In another embodiment, a shaft assembly includes a shaft according to another embodiment, a first component attached at the first attachment portion, a second component attached at the second attachment portion, a tie rod extending through the inner shaft space along the axis, and a tie rod support disposed in the tie rod support pocket. A first end of the tie rod is attached to a first retention nut and disposed at a first axial end of the shaft assembly. A second end of the tie rod is attached to a second retention nut and disposed at a second axial end of the shaft assembly, such that the first component, the shaft, and the second component are held in a preloaded arrangement. The tie rod support is annular, surrounds at least a portion of the tie rod, and is configured to reduce bending of the tie rod. A first axial face of the tie rod support abuts the first component and a second axial face of the tie rod support abuts the retention flange.

In a further embodiment, an air compressor includes a shaft assembly and a housing. The shaft assembly includes a shaft according to another embodiment centered on and extending along a shaft axis, a compressor rotor attached to the first attachment portion, a housing surrounding the compressor rotor, a motor attached to the second attachment portion, a tie rod extending through the inner shaft space along the shaft axis, and a tie rod support disposed in the tie rod support pocket. The compressor is configured to compress a flow of air. The motor is configured to cause the shaft and compressor rotor to rotate. A first end of the tie rod is attached to a first retention nut and disposed at a first axial end of the shaft assembly. A second end of the tie rod is attached to a second retention nut and disposed at a second axial end of the shaft assembly, such that the first component, the shaft, and the second component are held in a preloaded arrangement. The tie rod support is annular, surrounds at least a portion of the tie rod, and is configured to reduce bending of the tie rod. A first axial face of the tie rod support abuts the first component and a second axial face of the tie rod support abuts the retention flange. The housing defines an inlet configured to intake the flow of air and an outlet configured to output a compressed flow of air.

The present summary is provided only by way of example, and not limitation.

Other aspects of the present disclosure will be appreciated in view of the entirety of the present disclosure, including the entire text, claims, and accompanying figures.

Figure 1:
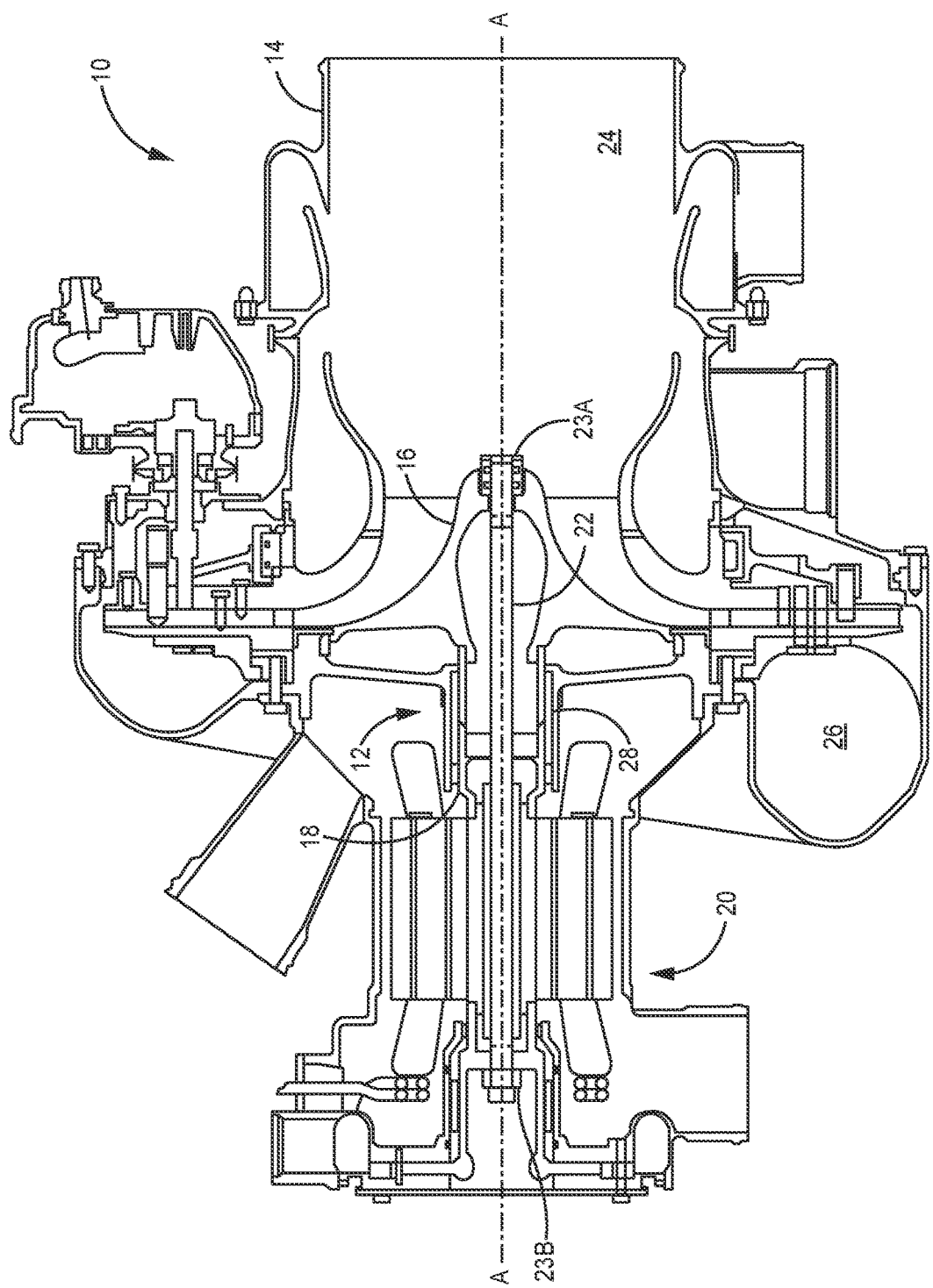
FIG. 1 is a cross-sectional view of an example of a cabin air compressor.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention includes structures for shafts for use with air compressors, such as a cabin air compressor or another air compressor that can be used to provide pressurized air to an environmental control system (ECS) of an aircraft. The structures disclosed herein reduce the failure rate of tie rods used to preload and clamp air compressor shaft assemblies. Further, the structures disclosed herein advantageously improve the ease of installing a tie rod support (TRS) in an air compressor shaft.

FIG. 1 is a cross-sectional view of air compressor 10. Air compressor 10 can be used to provide pressurized air to an aircraft ECS. Air compressor 10 includes shaft assembly 12 and housing 14. Shaft assembly 12 includes compressor rotor 16, shaft 18, motor 20, and tie rod 22. Shaft 18 rotationally couples motor 20 to compressor rotor 16 and housing 14 defines air inlet 24 and air outlet 26. Air inlet 24 is fluidly connected to a source of unpressurized air. Air outlet 26 is fluidly connected to an ECS. Shaft assembly 12 is centered on axis A-A, such that shaft 18 extends along axis A-A and compressor rotor 16 and motor 20 are attached e.g. at opposite axial ends of shaft 18.

In operation, motor 20 drives the rotation of compressor rotor 16 through shaft 18. Motor 20 can be, for example, an electric motor. Compressor rotor 16 directs air through housing 14 when compressor rotor 16 is rotated by motor 20. Specifically, flow of air $F_a$ enters housing 14 through inlet 24 and is pumped radially outward by compressor rotor 16, pressurizing flow of air $F_a$. The pressurized flow of air then exits housing 14 through outlet 26 and flows to another location where it can be used, such as an aircraft ECS.

Tie rod 22 functions to axially preload and provide an axial clamping force to the components of shaft assembly 12, including compressor rotor 16, shaft 18, and motor 20. Tie rod 22 is centered on axis A-A and extends through each of compressor rotor 16, shaft 18, and motor 20. The ends of tie rod 22 are attached to retention nuts 23A—B and are located at the axial ends of shaft assembly 12. Retention nut 23A attached to a first end of tie rod 22 near compressor rotor 16. Retention nut 23B is attached at a second, opposite end of tie rod 22 near motor 20. Shaft 18 is hollow, allowing tie rod 22 to extend through the interior space of shaft 18 to each of compressor rotor 16 and motor 20. This arrangement allows tie rod 22 to prevent axial movement of compressor rotor 16, shaft 18, and motor 20 relative to one another. Shaft 18 is also surrounded by journal bearing 28, which is disposed in housing 14 and is centered on axis A-A. Journal bearing 28 is generally annular and functions to support shaft 18 as it is rotated by motor 20 and prevent radial movement of shaft 18 relative to axis A-A.

Compressor rotor 16 is depicted in FIG. 1 as an impeller and that air compressor 10 depicted in FIG. 1 functions as a radial compressor. However, it should be understood that compressor rotor 16 can have any structure suitable for pressurizing a flow of air. For example, compressor rotor 16 can also be an axial-flow compressor rotor such that air compressor 10 function as an axial-flow compressor.

During operation, tie rod 22 can achieve a bending mode that can cause tie rod 22 to fail and break. As shaft assembly 12 is held together in a preloaded arrangement by tie rod 22, loss of tie rod 22 due to breakage allows compressor rotor 16, shaft 18, and motor 20 to move relative to one another along axis A-A, potentially damaging housing 14 or another component of air compressor 10. As will be described in more detail subsequently, a tie rod support (TRS) can be provided within shaft 18 to support tie rod 22 and prevent tie rod 22 from achieving a detrimental bending mode. The TRS is generally annular such that it surrounds tie rod 22 within shaft 18.

Shaft assembly 12 can be constructed sequentially, first by installing a TRS within shaft 18. The shaft 18/TRS assembly can be fit against motor 20 and the compressor rotor 16 can be fit onto shaft 18. Tie rod 22 can then be inserted through shaft 18 and the TRS and used to clamp shaft assembly 12 into a preloaded arrangement.

Figure 2:
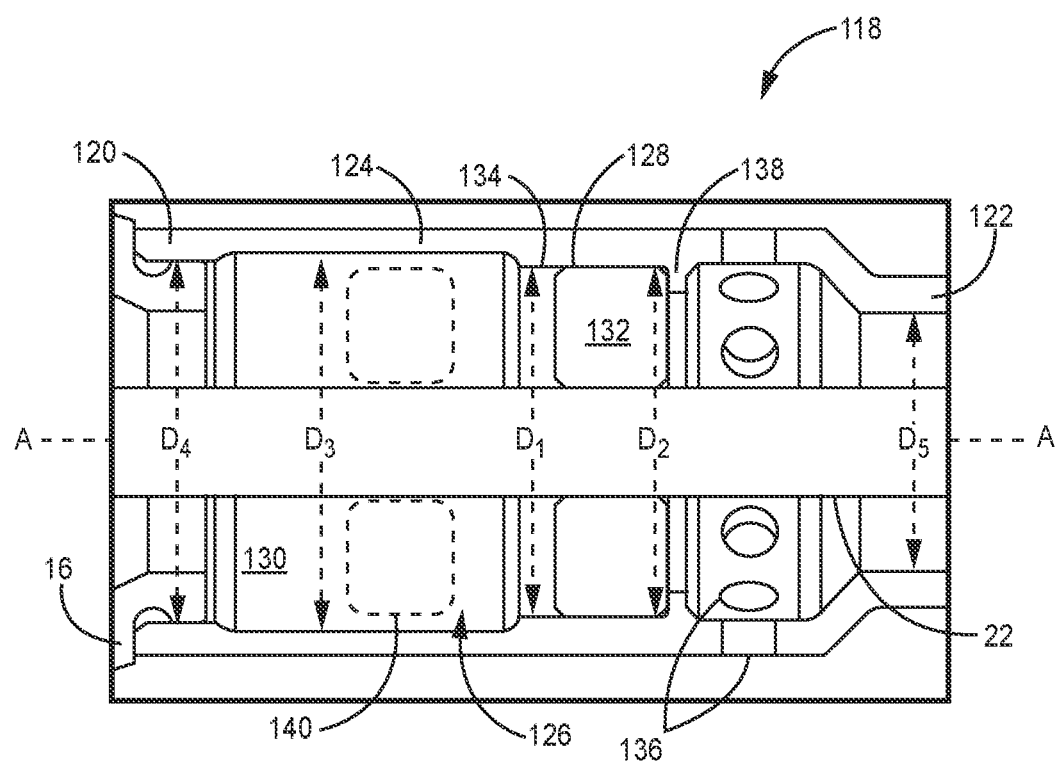
FIG. 2 is a cross-sectional view of an example of a shaft assembly for use with the cabin air compressor of FIG. 1.

FIG. 2 is a cross-sectional view of shaft 118, which is a known shaft that can be used in shaft assembly 12 in place of shaft 18. Shaft 118 includes first attachment portion 120, second attachment portion 122, and intermediate portion 124. The inner wall of intermediate portion 124 defines inner space 126, through which tie rod 22 extends. Inner space 126 includes TRS pocket 128 and shaft pocket 130, which are separated by annular shoulder 134. TRS pocket 128 is configured to receive TRS 132, which radially surrounds tie rod 22. TRS 132 provides radial support to tie rod 22 during operation of air compressor 10. Shaft 118 has an inner diameter $D_1$ at shoulder 134, an inner diameter $D_2$ at TRS pocket 128, and an inner diameter $D_3$ at shaft pocket 130.

First attachment portion 120 is configured to receive a first component and second attachment portion 122 is configured to receive a second component, such that shaft 118 rotationally couples the first and second components. In the depicted example, the first component received by first attachment portion 120 is compressor rotor 16. The second component received by second attachment portion 122 can be, for example, motor 20. First attachment portion 120 has an inner diameter $D_4$ that is different from the inner diameter $D_5$ of second attachment portion. Thus, shaft 118 can accept components having different outer diameters. It should be understood, however, that shaft 118 can also be configured to receive two components having the same or substantially the same outer diameter.

Intermediate portion 124 also includes a plurality of cooling holes 136. Cooling holes 136 are perforate the wall of shaft 118 in an annular pattern that is centered on axis A-A between TRS pocket 128 and second attachment portion 122. During operation of air compressor 10, cooling holes 136 allow air from the inner space 126 of shaft 118 to flow outward toward and cool journal bearing 28, mitigating heat imparted to journal bearing 28 from to the rotation of shaft 118 against journal bearing 28.

TRS 132 has a generally annular shape and surrounds tie rod 22. As described previously, TRS 132 functions to prevent tie rod 22 from achieving a bending mode during operation of air compressor 10. TRS 132 is disposed in TRS pocket 128, which is formed by the inner wall of shaft 118, shoulder 134, and rib 138. Shoulder 134 is a raised portion of the inner wall of shaft 118 that functions to prevent axial movement of TRS 132 toward first attachment portion 120 at ambient temperatures. However, TRS 132 must pass over shoulder 134 to be installed in TRS pocket 128, limiting the size of shoulder 134 and, therefore, the size of inner diameter $D_1$. As such, the difference between the inner diameter $D_1$ of shaft 118 at shoulder 134 and the inner diameter $D_2$ of shaft 118 in TRS pocket 128 is generally small. For example, the difference in diameter between $D_1$ and $D_2$ can be as small as 0.02 inches.

To secure TRS 132 within TRS pocket 128, TRS 132 can have an interference fit with TRS pocket 128. That is, at an ambient temperature, the outer diameter of TRS 132 can be greater than the inner diameter $D_2$ of TRS 132. The interference fit between TRS 132 and TRS pocket 128 can pose challenges for installation of TRS 132 in TRS pocket 128, as TRS 132 must pass over shoulder 134, which has an inner diameter $D_1$ that is less than the inner diameter $D_2$ of TRS pocket 128. TRS 132 can also have an interference fit with tie rod 22, such that the outer diameter of tie rod 22 is greater than the inner diameter of TRS 132. An interference fit between TRS 132 and tie rod 22 can reduce the relative movement of TRS 132 and tie rod 22, thereby improving the support that TRS 132 provides tie rod 22 during operation of air compressor 10.

TRS 132 is made of a polymer material that can experience material creep at the operating temperature of air compressor 10, resulting in a permanent plastic deformation that decreases the outer diameter of TRS 132. Despite the interference fit between TRS 132 and TRS pocket 128, the amount of material creep experienced by TRS 132 can cause TRS 132 to permanently contract to a diameter that is less than $D_2$ of TRS pocket 128, allowing TRS 132 to adopt a stress-free state. As used herein, a "stress-free" state of TRS 132 refers to a state in which the outer diameter of TRS 132 is less than the inner diameter $D_2$ of TRS pocket 128. Further, the amount of material creep experienced by TRS 132 can cause the outer diameter of TRS 132 to become smaller than the inner diameter $D_1$ of shoulder 134, allowing TRS 132 to migrate to (represented by dashed lines 140) shaft pocket 130. As the inner diameter $D_3$ of shaft pocket 130 is substantially larger than the diameter $D_2$ of TRS pocket 128, TRS 132 does not provide adequate support to tie rod 22 when it is located in shaft pocket 130. Consequently, migration of TRS 132 out of TRS pocket 128 and into shaft pocket 130 can allow tie rod 22 to achieve a bending mode during operation of air compressor 10 and break.

Figure 3:
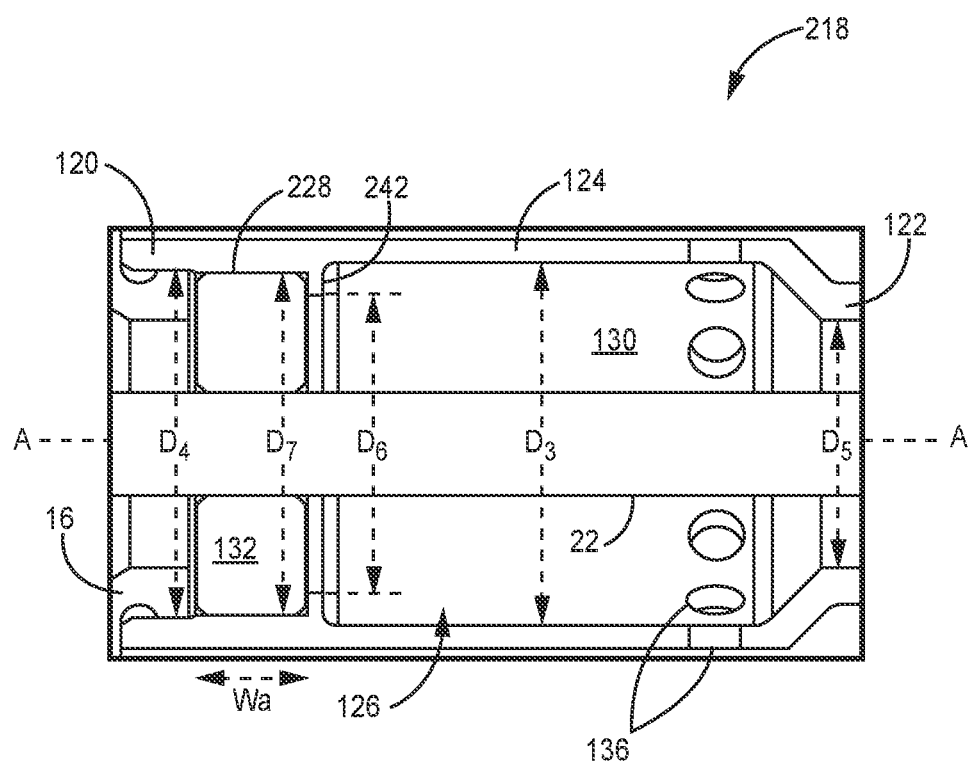
FIG. 3 is a cross-sectional view of an example of an improved shaft assembly for use with the cabin air compressor of FIG. 1.

FIG. 3 is a cross-sectional view of shaft 218, which is similar to shaft 118 but lacks TRS pocket 128, shoulder 134, and rib 138. TRS 132 is disposed in TRS pocket 228 of shaft 218, which is formed between first attachment portion 120 and retention flange 242. Retention flange 242 is integral to shaft 218, allowing shaft 218 to be formed as a single workpiece using casting or another suitable method of manufacture.

Advantageously, TRS pocket 228 of shaft 218 reduces the axial movement of TRS 132 as compared to TRS pocket 128 of shaft 118. Positioning TRS 132 adjacent to first attachment portion 120 allows compressor rotor 16 to prevent axial movement of TRS 132 out of shaft 218 through first attachment portion 120. Similarly, Retention flange 242 prevents axial movement of TRS 132 toward second attachment portion 124.

The size of retention flange 242 is selected such that the inner diameter $D_6$ of retention flange 242 is less than the permanently-reduced outer diameter of TRS 132 following material creep at the operating temperature of air compressor 10. Consequently, TRS 132 cannot migrate out of TRS pocket 228 after it has experienced material creep at the operating temperature of air compressor 10, as retention flange 242 prevents axial movement of TRS 132 toward second attachment portion 124 and compressor rotor 16 prevents axial movement of TRS 132 out of shaft 218 through first attachment portion 120. Trapping TRS 132 in TRS pocket 228 allows TRS 132 to provide adequate support to tie rod 22 when TRS 132 is in a stress-free state. To this extent, TRS pocket 228 prevents breakage of tie rod 22 without requiring redesign of TRS 132.

The size of retention flange 242 can be selected such that the inner diameter $D_6$ of retention flange 242 is approximately ~85% of the inner diameter $D_7$ of TRS pocket 228. As a specific and non-limiting example, the inner diameter $D_6$ of retention flange 242 can be approximately 1.38 inches and the inner diameter $D_7$ of TRS pocket 228 can be approximately 1.63 inches. Moreover, the axial spacing of retention flange 242 from first attachment portion 120 defines the width $W_a$ of TRS pocket 228. The width $W_a$ of TRS pocket 228 is generally selected to be substantially the same as the axial thickness of TRS 132 to reduce axial movement of TRS 132. In some examples, the width $W_a$ of TRS pocket 228 is slightly less than the axial thickness of TRS 132 so that TRS 132 has a press fit with retention flange 242 and compressor rotor 16.

TRS pocket 228 of shaft 218 also allows for simpler installation of TRS 132 than TRS pocket 128 of shaft 118. As axial movement of TRS 132 through first attachment portion 120 is prevented by compressor rotor 16, TRS pocket 228 lacks shoulder 134. Consequently, TRS 132 does not need to pass over shoulder 134 in order to be installed in TRS pocket 228. This also allows the use of TRS 132 having a larger outer diameter than could previously be used with TRS pocket 128, increasing the strength of the interference fit between TRS 132 and TRS pocket 228 as compared to the strength of the interference fit between TRS 132 and TRS pocket 128.

The design of shaft 218 causes TRS 132 remains trapped in TRS pocket 228 regardless of the inner diameter $D_4$ of first attachment portion 120. As depicted in FIG. 3, inner diameter $D_4$ of first attachment portion 120 is larger than inner diameter $D_7$ of TRS pocket 228. However, the inner diameter $D_4$ of first attachment portion 120 is generally at least equal to the inner diameter $D_7$ of TRS pocket 228 in order to facilitate installation of TRS 132 in TRS pocket 228.

Further, the material of TRS 132 can be selected to minimize material creep of TRS 132. For example, TRS 132 can be formed from polybenzimidazole (PBI), which is creep-resistant and is less susceptible to deformation at high temperatures as compared to other polymer materials that can be used to form TRS 132. Forming TRS 132 from a creep- and deformation-resistant material allows for the inner diameter of TRS 132 to be increased relative to the outer diameter of tie rod 22, decreasing the strength of the interference fit of TRS 132 and tie rod 22 at an ambient temperature, while ensuring that tie rod 22 is adequately supported by TRS 132 at the operating temperature of air compressor 10. Advantageously, this allows for improved ease of installation of tie rod 22 in a shaft assembly 12 by improving the ease with which tie rod 22 can be inserted through the center of annular TRS 132.

As non-limiting examples, the ratio of inner diameters $D_3$ and $D_6$ can be approximately 1.26, the ratio of inner diameters $D_3$ and $D_7$ can be approximately 1.07, and the ratio of inner diameters $D_3$ and $D_4$ can be approximately 1.03. The ratio of inner diameters $D_6$ and $D_7$ can be approximately 0.85, and the ratio of inner diameters $D_6$ and $D_4$ can be approximately 0.83. The ratio of inner diameters $D_7$ and $D_4$ can be approximately 0.97.

As additional non-limiting examples, the ratio of $W_a$ of TRS pocket 228 to the axial width of first attachment portion 120 can be approximately 1.33 and the ratio of $W_a$ of TRS pocket 228 to the axial width of retention flange 242 can be approximately 6.31. The ratio of the axial width of first attachment portion 120 to the axial width of retention flange 242 can be approximately 4.75. The ratio of the outer diameter and the inner diameter of TRS 132 can be approximately 3.32. The ratio of the outer diameter of TRS 132 and $D_7$ can be approximately 1.0006. The ratio of the outer diameter of tie rod 22 and the inner diameter of TRS 132 can be approximately 1.003.

It should be understood that shafts 118 and 218 can have the reverse configuration of the configurations shown in FIGS. 2 and 3. That is, shafts 118 and 218 can be configured so that motor 20 is received at first attachment portion 120 and compressor rotor 16 is received at second attachment portion 122. Further, in some examples, shaft assembly 12 can include intervening components that couple rotor 16 and shaft 218 or motor 20 and shaft 218. As such, it should be understood that first attachment portion 120 and second attachment portion 122 can also be configured to receive those intervening components.

Discussion of Possible Embodiments

The following are non-exclusive descriptions of possible embodiments of the present invention.

An embodiment of a shaft for a cabin air compressor includes a first attachment portion, a second attachment portion, an intermediate portion, a retention flange, and a tie rod support pocket. The first attachment portion is disposed at a first end of the shaft and is configured to attach to a first component. The second attachment portion is disposed at a second end of the shaft opposite the first end and is configured to attach to a second component. The intermediate portion extends from the first attachment portion to the second attachment portion and an interior wall of the intermediate portion defines an inner shaft space. The retention flange extends a first distance into the inner shaft space from the interior wall of the intermediate portion and is offset from the first attachment portion by a second distance. The tie rod support pocket is defined by the interior wall, extends between the flange and the first attachment portion, and is configured to receive a tie rod support.

The shaft of the preceding paragraph can optionally include, additionally and/or alternatively, any one or more of the following features, configurations and/or additional components:

A shaft for a cabin air compressor according to an exemplary embodiment of this disclosure includes, among other possible things, a first attachment portion, a second attachment portion, an intermediate portion, a retention flange, and a tie rod support pocket. The first attachment portion is disposed at a first end of the shaft and is configured to attach to a first component. The second attachment portion is disposed at a second end of the shaft opposite the first end and is configured to attach to a second component. The intermediate portion extends from the first attachment portion to the second attachment portion and an interior wall of the intermediate portion defines an inner shaft space. The retention flange extends a first distance into the inner shaft space from the interior wall of the intermediate portion and is offset from the first attachment portion by a second distance. The tie rod support pocket is defined by the interior wall, extends between the flange and the first attachment portion, and is configured to receive a tie rod support.

A further embodiment of the foregoing shaft, wherein the first distance is greater than an amount of material creep of an outer diameter of the tie rod support at an operating temperature of the cabin air compressor.

A further embodiment of any of the foregoing shafts, wherein the second distance is less than an axial thickness of the tie rod support at an ambient temperature.

A further embodiment of the foregoing shafts, wherein the intermediate portion is centered on and extends along an axis.

A further embodiment of any of the foregoing shafts, wherein a diameter of the shaft is different at each of the first attachment portion, the second attachment portion, the intermediate portion, and the tie rod support pocket.

A further embodiment of any of the foregoing shafts, wherein the first component is a compressor rotor.

A further embodiment of any of the foregoing shafts, wherein the second component is a motor configured to rotate the shaft.

A further embodiment of any of the foregoing shafts, further comprising a tie rod extending through the inner shaft space along the axis.

A further embodiment of any of the foregoing shafts, wherein the tie rod is configured to hold the first component, the shaft, and the second component in a preloaded arrangement.

A further embodiment of any of the foregoing shafts, further comprising an annular journal bearing that surrounds at least a portion of the shaft between the second attachment portion and the tie rod support pocket.

A further embodiment of any of the foregoing shafts, further comprising a cooling hole formed in the intermediate portion of the shaft.

A further embodiment of any of the foregoing shafts, wherein the cooling hole is configured to cool the annular journal bearing.

A further embodiment of any of the foregoing shafts, further comprising a tie rod support disposed within the tie rod support pocket.

A further embodiment of any of the foregoing shafts, wherein a first axial face of the tie rod support abuts the first attachment portion.

A further embodiment of any of the foregoing shafts, wherein a second axial face of the tie rod support abuts the retention flange.

A further embodiment of any of the foregoing shafts, wherein the tie rod support comprises a polybenzimidazole material.

A further embodiment of any of the foregoing shafts, wherein the tie rod support has an interference fit with the tie rod support pocket at an ambient temperature.

A further embodiment of any of the foregoing shafts, wherein the tie rod support is generally annular and extends along an axis.

A further embodiment of any of the foregoing shafts, wherein the shaft is centered on and extends along the axis.

An embodiment of a shaft assembly includes a shaft according to another embodiment of this disclosure, a first component attached at the first attachment portion, a second component attached at the second attachment portion, a tie rod extending through the inner shaft space along the axis, and a tie rod support disposed in the tie rod support pocket. A first end of the tie rod is attached to a first retention nut and disposed at a first axial end of the shaft assembly. A second end of the tie rod is attached to a second retention nut and disposed at a second axial end of the shaft assembly, such that the first component, the shaft, and the second component are held in a preloaded arrangement. The tie rod support is annular, surrounds at least a portion of the tie rod, and is configured to reduce bending of the tie rod. A first axial face of the tie rod support abuts the first component and a second axial face of the tie rod support abuts the retention flange.

The shaft assembly of the preceding paragraph can optionally include, additionally and/or alternatively, any one or more of the following features, configurations and/or additional components:

A shaft assembly according to an exemplary embodiment of this disclosure includes, among other possible things, a shaft according to another embodiment of this disclosure, a first component attached at the first attachment portion, a second component attached at the second attachment portion, a tie rod extending through the inner shaft space along the axis, and a tie rod support disposed in the tie rod support pocket. A first end of the tie rod is attached to a first retention nut and disposed at a first axial end of the shaft assembly. A second end of the tie rod is attached to a second retention nut and disposed at a second axial end of the shaft assembly, such that the first component, the shaft, and the second component are held in a preloaded arrangement. The tie rod support is annular, surrounds at least a portion of the tie rod, and is configured to reduce bending of the tie rod. A first axial face of the tie rod support abuts the first component and a second axial face of the tie rod support abuts the retention flange.

A further embodiment of the foregoing shaft assembly, wherein the tie rod has an interference fit with the tie rod support at an ambient temperature.

An embodiment of an air compressor includes a shaft assembly and a housing. The shaft assembly includes a shaft according to another embodiment centered on and extending along a shaft axis, a compressor rotor attached to the first attachment portion, a housing surrounding the compressor rotor, a motor attached to the second attachment portion, a tie rod extending through the inner shaft space along the shaft axis, and a tie rod support disposed in the tie rod support pocket. The compressor is configured to compress a flow of air. The motor is configured to cause the shaft and compressor rotor to rotate. A first end of the tie rod is attached to a first retention nut and disposed at a first axial end of the shaft assembly. A second end of the tie rod is attached to a second retention nut and disposed at a second axial end of the shaft assembly, such that the first component, the shaft, and the second component are held in a preloaded arrangement. The tie rod support is annular, surrounds at least a portion of the tie rod, and is configured to reduce bending of the tie rod. A first axial face of the tie rod support abuts the first component and a second axial face of the tie rod support abuts the retention flange. The housing defines an inlet configured to intake the flow of air and an outlet configured to output a compressed flow of air.

The air compressor of the preceding paragraph can optionally include, additionally and/or alternatively, any one or more of the following features, configurations and/or additional components:

An air compressor includes a shaft assembly and a housing. The shaft assembly includes a shaft according to another embodiment centered on and extending along a shaft axis, a compressor rotor attached to the first attachment portion, a housing surrounding the compressor rotor, a motor attached to the second attachment portion, a tie rod extending through the inner shaft space along the shaft axis, and a tie rod support disposed in the tie rod support pocket. The compressor is configured to compress a flow of air. The motor is configured to cause the shaft and compressor rotor to rotate. A first end of the tie rod is attached to a first retention nut and disposed at a first axial end of the shaft assembly. A second end of the tie rod is attached to a second retention nut and disposed at a second axial end of the shaft assembly, such that the first component, the shaft, and the second component are held in a preloaded arrangement. The tie rod support is annular, surrounds at least a portion of the tie rod, and is configured to reduce bending of the tie rod. A first axial face of the tie rod support abuts the first component and a second axial face of the tie rod support abuts the retention flange. The housing defines an inlet configured to intake the flow of air and an outlet configured to output a compressed flow of air.

A further embodiment of the foregoing air compressor, wherein the housing comprises a journal bearing that surrounds at least a portion of the shaft between the second attachment portion and the tie rod support pocket.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A shaft for a cabin air compressor, the shaft comprising:
 a first attachment portion disposed at a first end of the shaft and configured to attach to a first component;
 a second attachment portion disposed at a second end of the shaft opposite the first end and configured to attach to a second component;
 an intermediate portion extending from the first attachment portion to the second attachment portion, wherein an interior wall of the intermediate portion defines an inner shaft space;
 a retention flange extending into the inner shaft space from the interior wall of the intermediate portion, wherein:
  the retention flange extends a first distance from the interior wall; and
  the retention flange is axially offset from the first attachment portion by a second distance;
 a tie rod support pocket defined by the interior wall and extending between the retention flange and the first attachment portion, wherein the tie rod support pocket is configured to receive a tie rod support; and
 a tie rod support disposed within the tie rod support pocket;
 wherein a first axial face of the tie rod support abuts the first attachment portion; and
 wherein a second axial face of the tie rod support abuts the retention flange.

2. The shaft of claim 1, wherein the first distance is greater than an amount of material creep of an outer diameter of the tie rod support at an operating temperature of the cabin air compressor.

3. The shaft of claim 1, wherein the second distance is less than an axial thickness of the tie rod support at an ambient temperature.

4. The shaft of claim 1, wherein the intermediate portion is centered on and extends along an axis.

5. The shaft of claim 4, wherein a diameter of the shaft is different at each of the first attachment portion, the second attachment portion, the intermediate portion, and the tie rod support pocket.

6. The shaft of claim 1, wherein the first component is a compressor rotor.

7. The shaft of claim 1, wherein the second component is a motor configured to rotate the shaft.

8. The shaft of claim 1, further comprising a tie rod extending through the inner shaft space along the axis.

9. The shaft of claim 8, wherein the tie rod is configured to hold the first component, the shaft, and the second component in a preloaded arrangement.

10. The shaft of claim 1, further comprising an annular journal bearing that surrounds at least a portion of the shaft between the second attachment portion and the tie rod support pocket.

11. The shaft of claim 10, further comprising a cooling hole formed in the intermediate portion of the shaft, wherein the cooling hole is configured to cool the annular journal bearing.

12. The shaft of claim 1, wherein the tie rod support comprises a polybenzimidazole material.

13. The shaft of claim 1, wherein the tie rod support has an interference fit with the tie rod support pocket at an ambient temperature.

14. The shaft of claim 1, wherein:
 the tie rod support is generally annular and extends along an axis; and
 the shaft is centered on and extends along the axis.

15. A shaft assembly comprising:
 the shaft of claim 1, wherein the shaft is centered on and extends along an axis;
 a first component attached at the first attachment portion;
 a second component attached at the second attachment portion;

a tie rod extending through the inner shaft space along the axis, wherein:
   a first end of the tie rod is attached to a first retention nut and disposed at a first axial end of the shaft assembly; and
   a second end of the tie rod is attached to a second retention nut and disposed at a second axial end of the shaft assembly, such that the first component, the shaft, and the second component are held in a preloaded arrangement; and
wherein
   the tie rod support is annular and surrounds at least a portion of the tie rod; and
   the tie rod support is configured to reduce bending of the tie rod.

16. The shaft assembly of claim 15, wherein the tie rod has an interference fit with the tie rod support at an ambient temperature.

17. An air compressor comprising:
  a shaft assembly comprising:
    the shaft of claim 1, wherein the shaft is centered on and extends along an axis;
    a compressor rotor attached at the first attachment portion, wherein the compressor rotor is configured to compress a flow of air;
    a motor attached at the second attachment portion, wherein the motor is configured to cause the shaft and compressor rotor to rotate;
    a tie rod extending through the inner shaft space along the axis, wherein:
      a first end of the tie rod is attached to a first retention nut and disposed at a first axial end of the shaft assembly; and
      a second end of the tie rod is attached to a second retention nut and disposed at a second axial end of the shaft assembly, such that the first component, the shaft, and the second component are held in a preloaded arrangement; and
    wherein the tie rod support is annular and surrounds at least a portion of the tie rod and the tie rod support is configured to reduce bending of the tie rod; and
  a housing surrounding the compressor rotor, wherein the housing defines an inlet configured to intake the flow of air and an outlet configured to output a compressed flow of air.

18. The air compressor of claim 17, wherein the housing comprises a journal bearing that surrounds at least a portion of the shaft between the second attachment portion and the tie rod support pocket.

\* \* \* \* \*